INVENTORS:
Byron M. Bird
AND
Ernst F. Muller,
BY
Chas. M. Nissen,
ATTY.

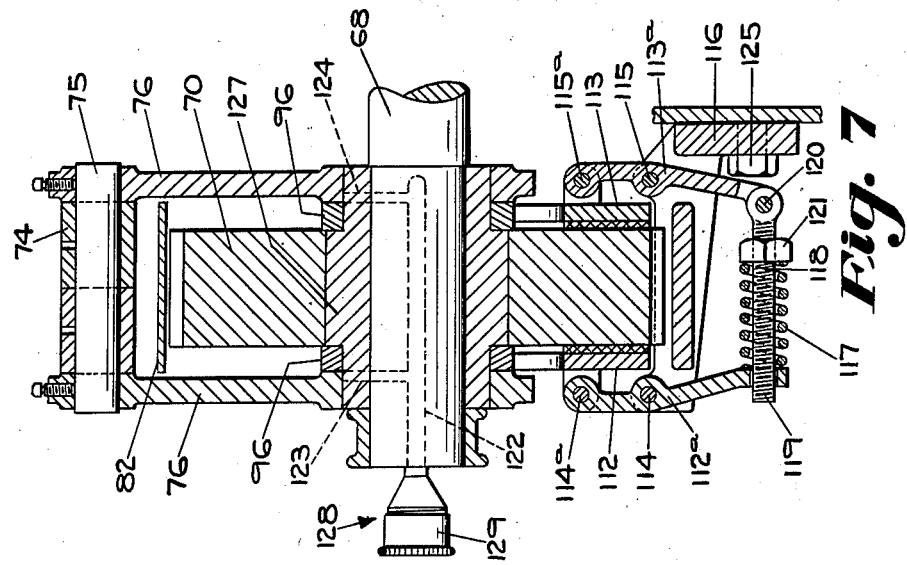
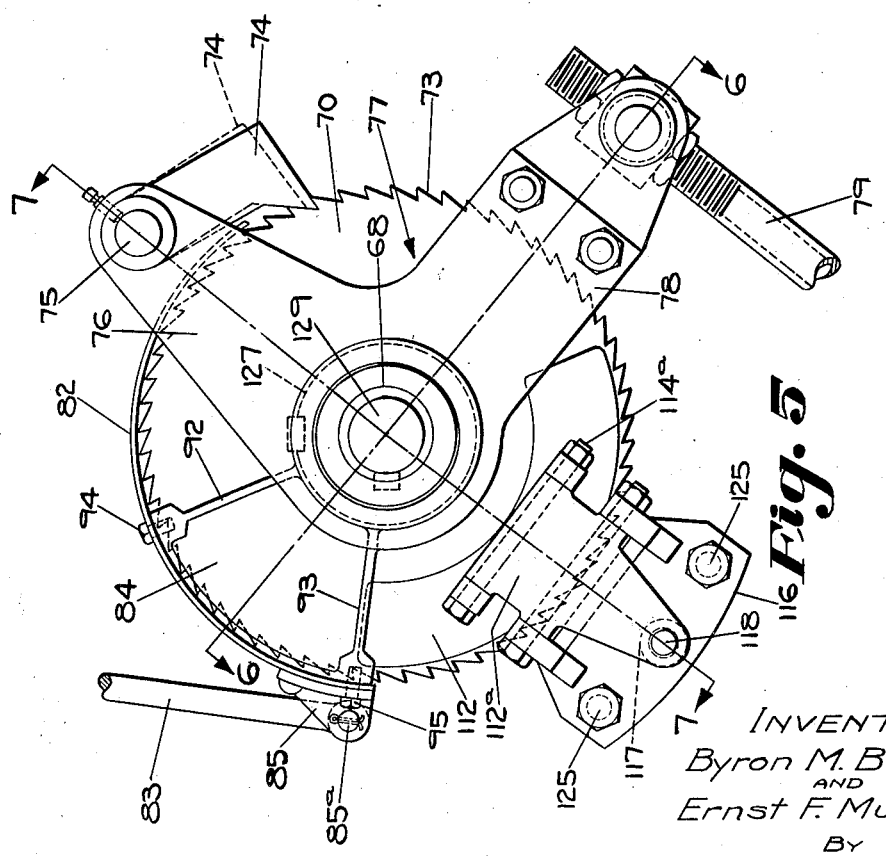
INVENTORS:
Byron M. Bird
AND
Ernst F. Muller,
BY
Chas. M. Nissen,
ATTY.

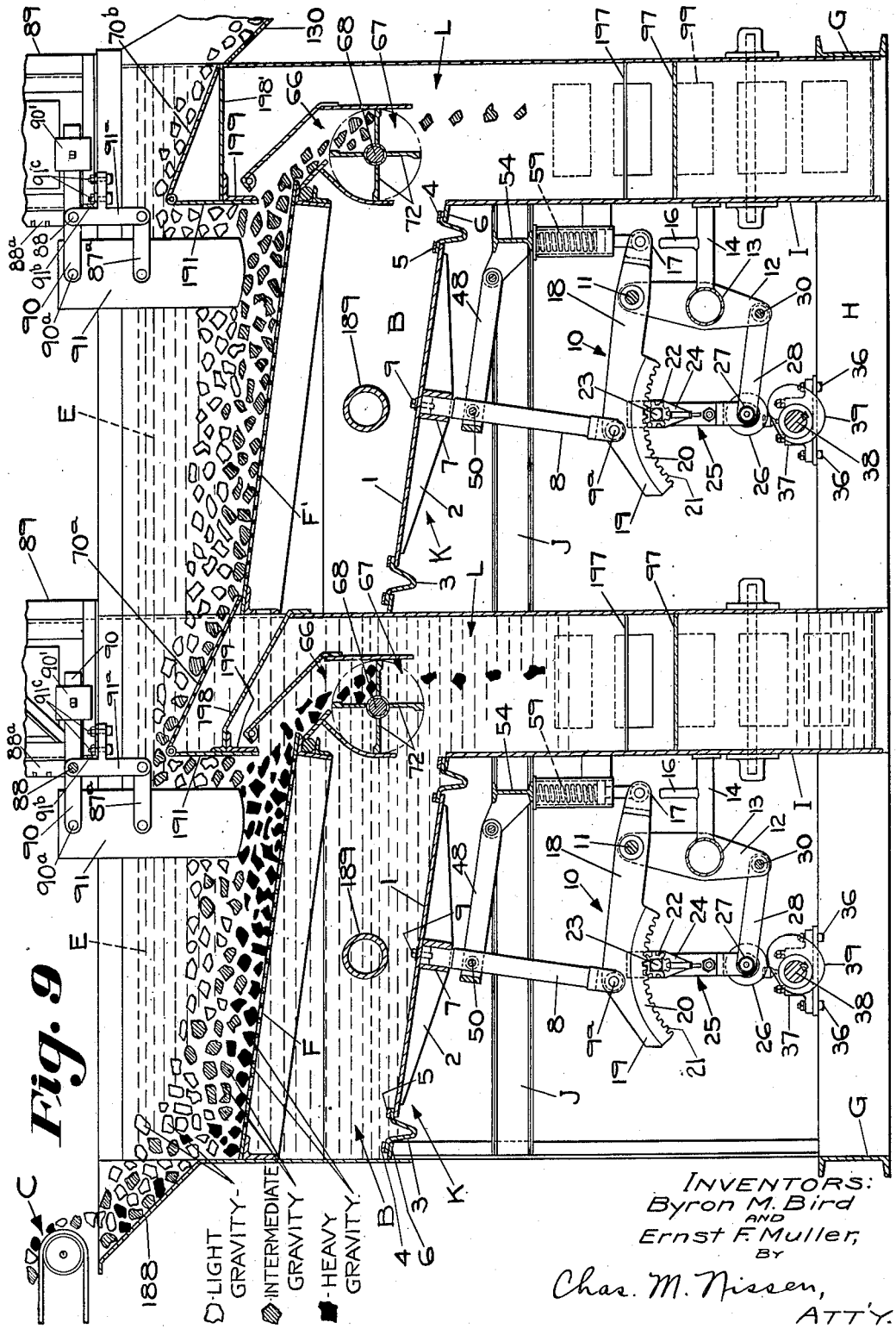

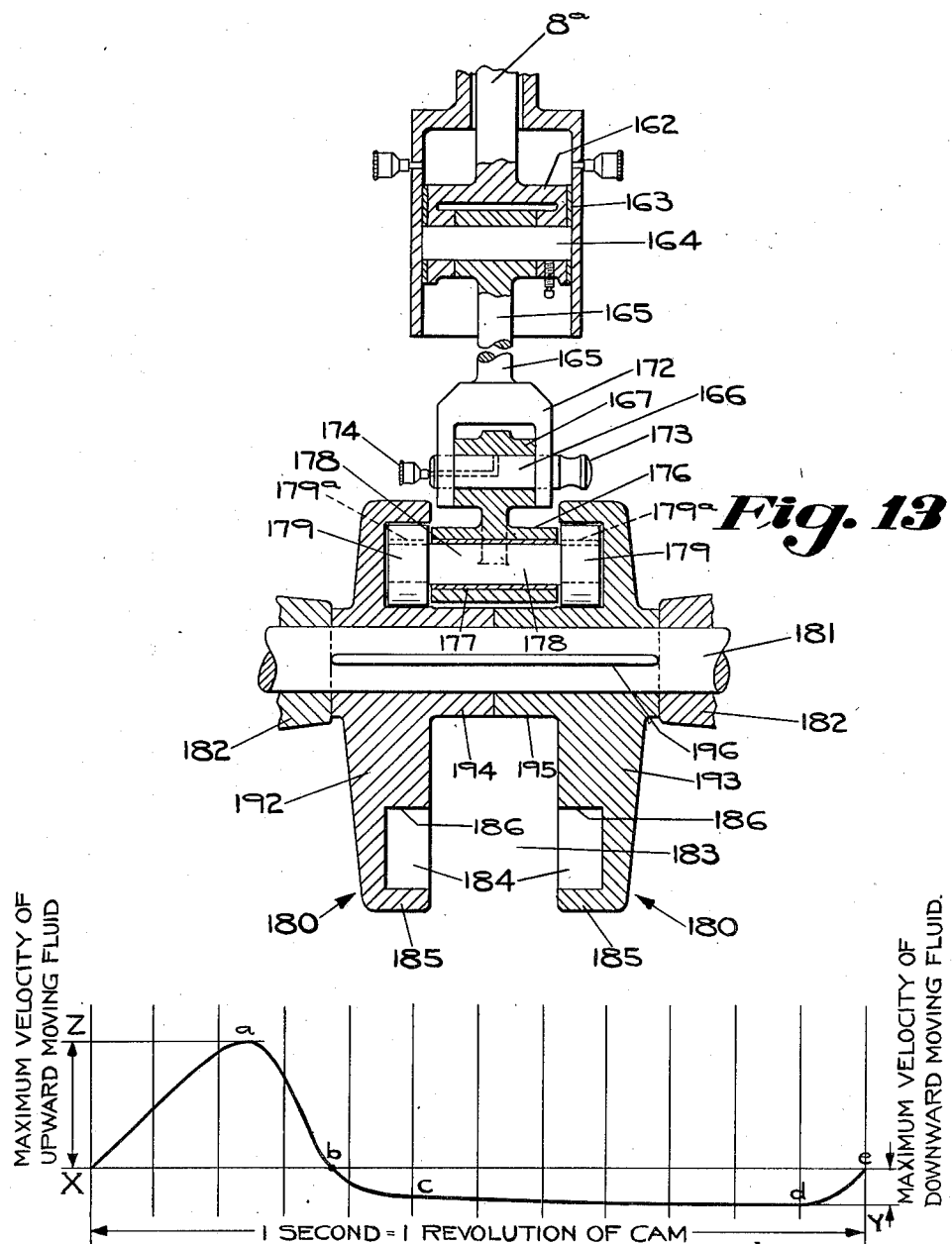

Patented Oct. 11, 1938

2,132,375

UNITED STATES PATENT OFFICE 2,132,375

APPARATUS FOR TREATING MINERAL MATERIALS

Byron M. Bird and Ernst F. Muller, Columbus, Ohio, assignors to The Jeffrey Manufacturing Company, a corporation of Ohio Application July 23, 1934, Serial No. 736,442
In Great Britain July 24, 1933

14 Claims. (Cl. 209—457)

This invention relates to a jig, and particularly to a jig which employs water as a jigging fluid for the stratification of minerals according to specific gravities.

An object of the invention is to provide a jig in which the cycle of the jigging fluid may be given any desired form.

Another object of the invention is to provide a jig in which a diaphragm or piston is employed to cyclically move a jigging liquid relative to a screen in accordance with a predetermined time-velocity curve of fluid movement, by employing a cam constructed in accordance with said desired time-velocity curve.

A still further object of the invention lies in the provision of mechanism for adjusting the stroke of the diaphragm.

A still further object of the invention is the provision of an improved form of discharge valve for collecting and discharging certain of the stratified components of the bed, together with the positioning of the valve with respect to the flow of material in order that a clean separation of the respective layers of the stratified bed will be accomplished.

A still further object of the invention is to arrange the mechanisms outlined in the preceding objects in series, the apparatus being arranged so that the bed is subject to a stratifying operation so that the components of the highest specific gravity will be separated first, the remaining bed being passed on and subjected to a second stratifying operation in a similar manner for the removal of the constituents of the next lightest specific gravity, and so on until the desired components are finally discharged from the apparatus.

A still further object includes the provision of means for imparting upward pulsating movements to a diaphragm while remaining substantially parallel to the jig screen, such means including parallel motion mechanism arranged to cause upward pulsations of the diaphragm to be effected in a direction approximately at right angles to the plane of the jig screen.

Other objects of the invention will become apparent from consideration of the following detailed description, the invention being exemplified in the combination and arrangement of parts shown in the accompanying drawings and described in the following specification, and it is more particularly pointed out in the appended claims.

In the drawings:

Fig. 5 is a side elevation of a ratchet wheel which operates a discharge valve;

Fig. 6 is a section on the line 6—6 of Fig. 5, looking in the direction of the arrows;

Fig. 7 is a section on the line 7—7 of Fig. 5, looking in the direction of the arrows;

Fig. 8 is a section on the line 8—8 of Fig. 4, looking in the direction of the arrows;

Fig. 9 is a longitudinal sectional elevation through the apparatus, indicating the stratification of a bed of materials being treated in the apparatus;

Fig. 13 is a detail sectional view of the modification shown in Fig. 10, the view showing the details of the mounting of the roller shown in Fig. 10 in the cam, and connecting mechanism between the roller and piston mechanism operated thereby, the view being taken generally along the line 13—13 of Fig. 10.

Fig. 14 is a time-velocity curve, diagrammatically representing the character of the stroke imparted by the cam, the abscissae $x$—$y$ representing the time of revolution of the cam, which is assumed, for purposes of illustration, to be one second, while the ordinates $x$—$z$ represent the velocities of the stroke during a complete revolution of the cam.

Figure 1:
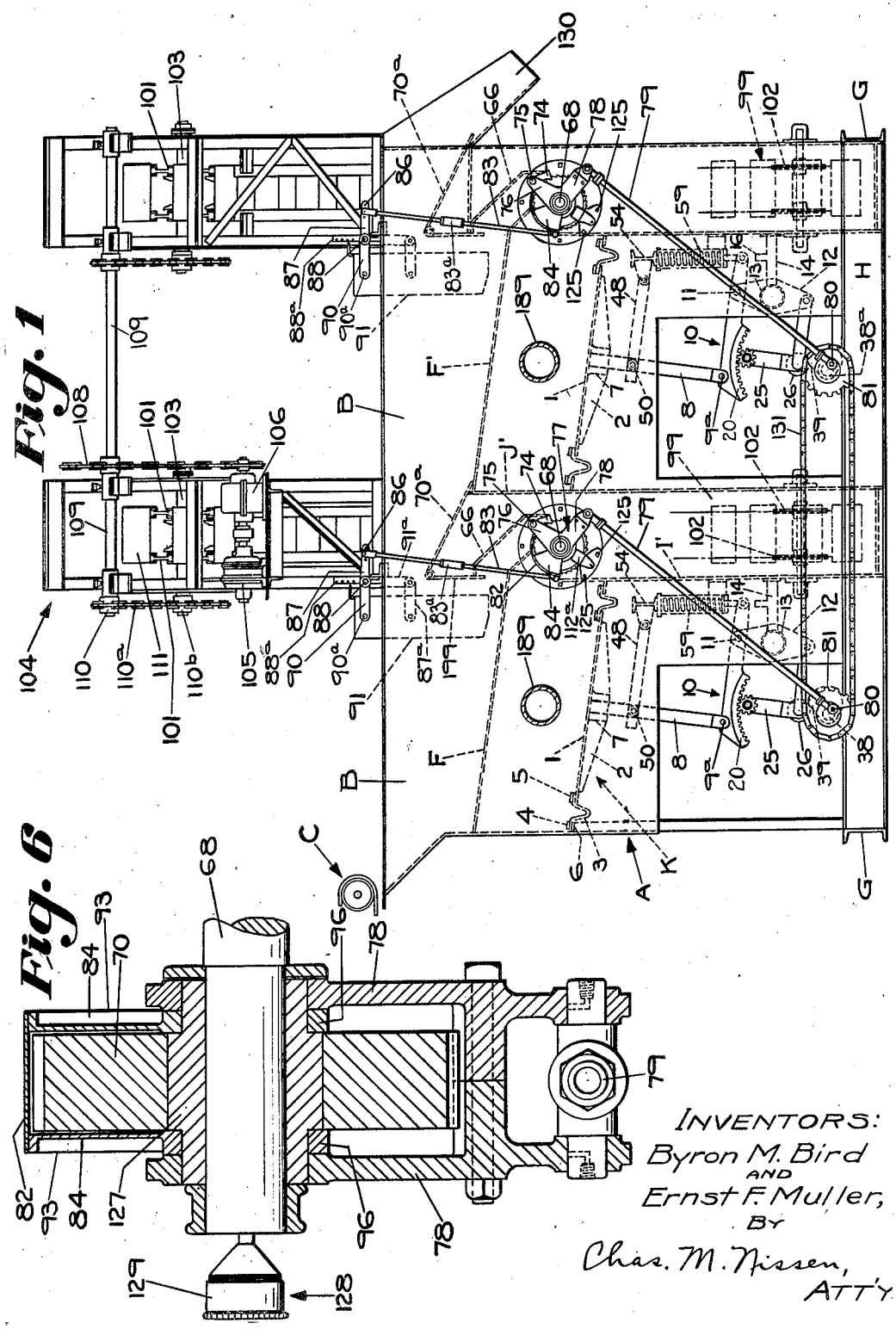
Fig. 1 is a side elevation of a jig embracing the present improvements.

Referring more particularly to the drawings, it will be seen that the apparatus comprises a tank A (Fig. 1) supported on suitable framework and containing compartments B, B, through which a stream or body of fluid, such as water, is adapted to flow at a desired rate, which rate is controlled by the conditions of operation, and by the nature of the materials being treated. In this connection, it may be mentioned that while the material specifically referred to herein will be coal, it will be apparent that the apparatus may be employed for stratifying any materials according to differences in specific gravities.

The material, such as coal, is fed continuously into the apparatus by any suitable feeding mechanism, such for example as that indicated generally at C, the coal falling through the body of fluid, usually water, indicated at E, finally settling upon the screen F. The screen F is inclined at a suitable angle to aid the flow of materials along the screen.

It will be observed that the tank A rests upon transverse and longitudinal base channels G and H, the vertical walls of each compartment B, B being braced by upper channels J connecting opposite vertical walls of each compartment.

Beneath the screen F is a diaphragm K mounted substantially parallel to the screen F and for oscillation substantially at right angles to the screen. This diaphragm comprises a plate 1 with a reinforcing web 2 therebeneath, and surrounded by a flexible ring 3, of rubber or the like, which is secured at 4 and 5 to the flanges 6 of the corresponding vertical compartment walls and to the plate 1, respectively, so as to form a water-tight joint around plate 1, while at the same time allowing, through the flexibility of this ring 3, vertical displacement of the diaphragm.

It will be noted that the diaphragm K (Fig. 9) is provided with a substantially central socket 7, and into this socket is inserted the rod 8, which is bolted to plate 1 of the diaphragm by means of a bolt 9. The rod 8 is pivotally interconnected at 9a to a rocker lever 10, which is fulcrumed at 11 to a fixed support 12. This support 12 is mounted on a tube 13 the ends of which are secured to the inner side walls of the tank. The bracket 14 is mounted between the tube 13 and the wall I, and has an upwardly projecting abutment 16 adapted to be engaged by the end 17 of the rocker lever 10 when this end is sufficiently depressed, abutment 16 thereby serving as a stop to limit the downward movement of the end 17 of the lever.

Figure 4:
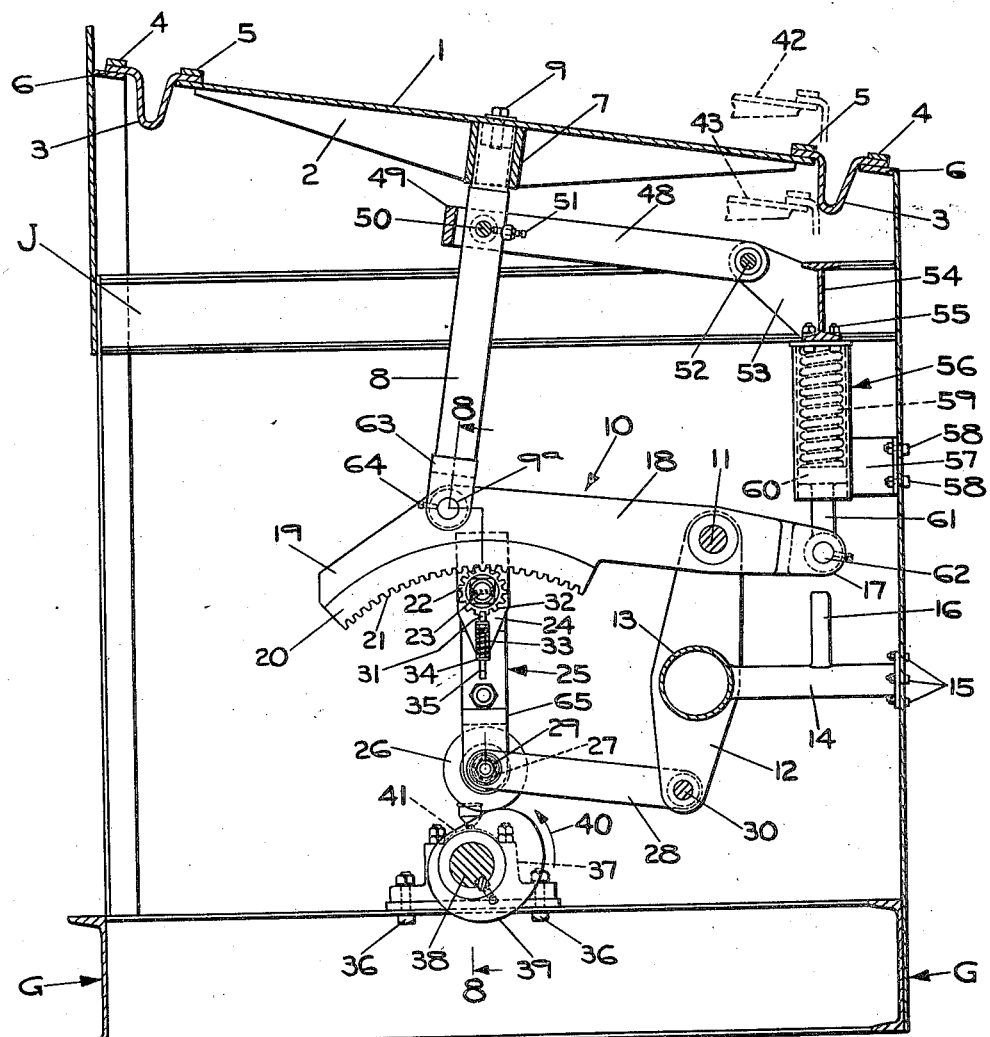
Fig. 4 is a sectional view taken on the line 4—4 of Fig. 2.

It will be seen that the longer arm 18 of the lever 10 is curved downwardly so that the end 19 of the arm 18 is positioned somewhat below the remainder of the lever, an arcuate rack 20, concentric with a shaft 27, being formed on the underside of the arm 10, the teeth 21 of which rack are engaged by a pinion 22 mounted on a shaft 23 extending, as indicated in Figs. 4 and 8, through a yoke 24. The rack 20 may be made as an integral part of the rocker 10. The pinion 22 is mounted at the upper end of the vertically extending arm 25, the lower end of which arm carries a roller 26. This roller 26 is mounted on a pin 27 which extends through the arm 25, and which also forms a pivotal mounting for the link 28, which is held in position by nuts 29 on the end of the pin 27, the link 28 being pivotally mounted at 30 to the stationary support 12 secured to the tube 13 the ends of which are attached to the inner walls of the tank.

The pinion 22 is held against rotation by engagement of a pawl 31 with the teeth 32 of the pinion, (see Figs. 4 and 8) the pawl being held continuously in releasable engagement by pressure of a spring 33 compressed between the pawl 31 and an abutment 34b extending from the bracket 34. The spring 33 is supported by the rod 35, the upper end of which rod forms the pawl 31 referred to above.

Held by bolts 36 to the base channels H of the tank A are bearings 37, in which bearings a shaft 38 is rotatably mounted. Shaft 38 carries a cam 39 which engages the roller 26 on the lower end of arm 25. The surface of the cam is such, that as it rotates in the direction of the arrow 40 of Fig. 4, it exerts a lifting movement on the roller 26, which is transmitted through the arm 25, the rocker 10 and rod 8 to the plate 1, this being correspondingly moved upwardly. Because of the shape of the cam surface, continued rotation of the cam produces a lowering of the mechanism. The weight of the water resting upon the diaphragm K prevents the roller disengaging the cam, thereby causing the mechanism to follow the configuration of the cam. The rapid progressive acceleration of the lifting movement of plate 1 during the lifting cycle of the cam and the subsequent gradual return of the plate 1 to its lowermost position, effects an efficient loosening of the particles of the bed, so that the stratification will take place in a very efficient manner. The limits of movement of the plate 1 are indicated by the upper dotted lines 42 in Fig. 4, and the lower dotted lines 43. The upward motion of the plate 1 forces the water through the bed on the screen F, thereby tending to lift the particles of the bed. The recession of the water accompanying the downward movement of the diaphragm K tends to leave the particles suspended and loosened so that stratification may take place when such suspended particles sink in accordance with the specific gravities of the components of the aforesaid materials.

Figure 2:
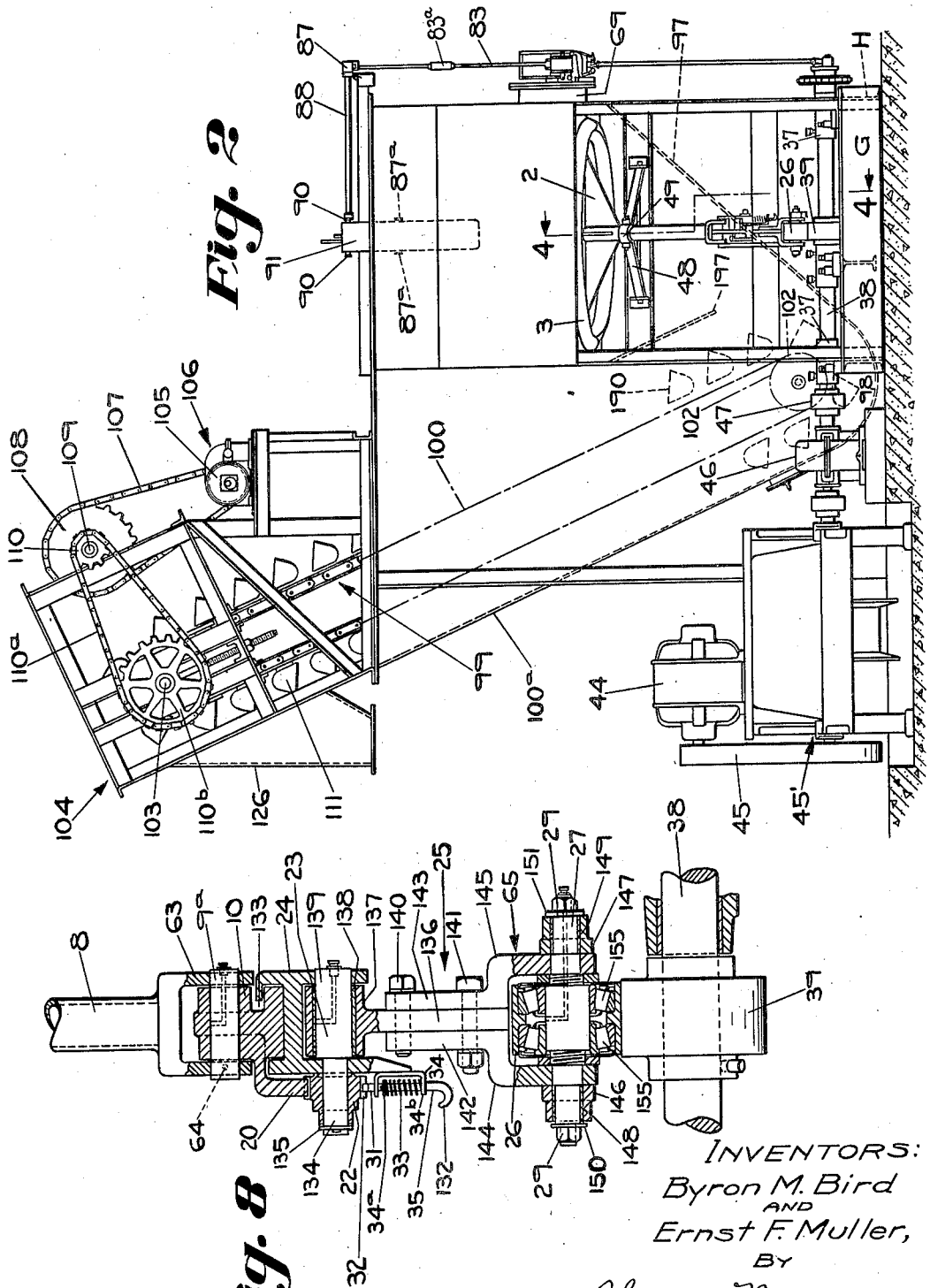
Fig. 2 is a front elevation of the same.

It will be noted in this connection that the shaft 38 which drives the cam 39 is driven at a desired rate of speed from a motor 44, Fig. 2, through a standard variable speed transmission 45', comprising a belt 45, connected to a speed reducer 46, this latter being operatively connected with the shaft 38 through the coupling 47.

It will further be noted from Fig. 4, that since a substantial load is supported by the plate 1, it is desirable to effect a partial counterbalancing of this load, so as to relieve the pressure on the cam 39 and reduce the upward force necessary to be exerted by the cam.

In order to confine the diaphragm 1 to positions in parallelism to each other and in parallelism to the screen F above the same, parallel motion mechanism is provided for the rod 8 in that an arm 48 parallel to the arm 18 is pivotally connected at one end 49 to the pin 50 extending through the rod 8 and held in place by the set screw 51, the other end of the arm 48 being pivoted at 52 to bracket 53 which extends from a beam 54 in turn connected to the cross channels J of the frame. Also, to the beam 54 is bolted, as indicated at 55, a housing 56, the lower end of which is connected to the vertical wall of the compartment through a bracket 57, this bracket being shown as bolted by bolts 58.

In the housing 56 is positioned a coil spring 59 which is compressed between the upper end of the housing 56 and the head 60 of a plunger 61, this plunger being pivoted at 62 to the end 17 of the rocker 10. It will therefore be seen that the weight on the plate 1 is partly supported or counterbalanced by the spring 59, the pressure of which acts upon the plunger 61 and tends to force the end 17 of the rocker 10 towards the stationary abutment 16, while the load on plate 1 tends to depress the end 19 of the rocker 10 for lifting the end 17 of the rocker against the aforesaid downward pressure of the spring 59, which therefore partially counterbalances the load and relieves the cam 39 of any excessive weight which might otherwise be transmitted to it. This spring 59 also forms a resilient mounting for the plate 1 and tends to absorb shocks incident to the vertical reciprocation of the plate.

Since the stratification of the bed of materials on the screen is dependent to a substantial extent upon the length of stroke of the plate, it is desirable to render this length of stroke adjustable, so that it may be varied in accordance with the character of the materials forming the bed. The adjustment of the length of this stroke is effected through the arcuate rack 20 and the mechanism associated therewith previously referred to, this rack being concentric with the pin 27, the arm 25 being the radius of the arc of the rack. The adjustment is effected by releasing the pawl 31 from the teeth 32 of the pinion 22, and moving the arm 25 about the pin 27 until the desired position of the pinion 22 relative to the rack 20 is obtained.

From Fig. 8 it will be noted that the pawl 31 is releasable from the pinion 22 by a manual pull exerted on the hook 132 formed on the lower end of the rod 35, thereby compressing the spring between the abutments 34a and 34b, the former being on the rod 35, the latter being a part of bracket 34. Yoke 24 extends into a groove 133, see Fig. 8, in the lever 10, which acts as a guide for the movement of yoke 24 relative to the lever 10 as the arm 25 is adjusted along the rack 20. The pinion 22 is fitted over the reduced portion 134 of the pin 23, the pinion 22 being held in place by the collar 135, which is engageable by a suitable tool to effect rotation of the pinion 22 along the rack 20, the arm 25 of course pivoting on the pin 27 as the pinion travels along the rack. The nearer the pinion 22 is to the left-hand end of the rack 20, as viewed in Fig. 4, for example, the shorter will be the stroke of the plate 1, and the nearer the pinion 22 is to the right-hand end of the rack, the longer will be the stroke of the plate 1.

From Fig. 8 it will be seen also that the lever 10 fits into a yoke 63 on the arm 8, the pin 9a joining the lever 10 with the yoke 63, a pin 64 preventing pin 9a from turning during operation of the mechanism, the pin 9a affording, however, a pivotal connection between the arm 8 and lever 10.

The arm 25 includes three parts, a central part 136 being formed with a hub 137 which is received in the yoke 24, as seen in Fig. 8. The hub 137 is provided with a bushing 138 in which is fitted the enlarged part 139 of pin 23, which pin secures the arm 25 in place in the yoke 24. To the central part 136 of arm 25 are bolted, as indicated at 140 and 141, a pair of corresponding plates 142 and 143, corresponding ends of which are bent, as indicated at 144 and 145, to form a yoke 65 in which the roller 26 is mounted on pin 27. This pin projects sufficiently beyond each side of the yoke 65 to receive the bearing portions 146, 147 of the lever 28, which portions are bushed by bushings 148 and 149 and retained on the pin 27 by collars 150 and 151 held by nuts 29, 29, threaded on the ends of pin 27. The roller 26 is mounted to run on anti-friction bearings 155, as will be apparent from Fig. 8.

It will be seen, from the mechanism above described, that pulsations are imparted to the plate 1, and that the bed of materials on the screen F will therefore be loosened so that stratification according to specific gravity may occur.

The completeness of the stratification is enhanced by the different velocities obtained by the different speeds at which the diaphragm is oscillated, due to the configuration of the cam 39. After a few cycles of the pulsating currents, distinct stratification of the particles on the screen will be obtained, grading from those of highest specific gravity at the bottom to those of the lightest specific gravity at the top. Since the bed of particles becomes fluid on each upward current of water, the particles of lowest specific gravity flow naturally over the end of the jig compartment at 70a, as the raw materials are continued to be fed onto the screen F from feeder C. 70a is preferably perforated to form a screen.

As the bed of materials of highest specific gravity collects on the screen F, it becomes slightly mobile upon each upward movement of the water, and as a portion of it is withdrawn through the chute 66, the balance of it flows forwardly owing to this fluid condition. This tendency to flow is aided by the slope of the screen F downwardly towards chute 66. At the lower end of chute 66 is a rotary valve 67, positioned in compartment L, intermediate the compartment B, B. This valve 67 is rotatably mounted with shaft 68, which is mounted in suitable bearings carried by the side walls of the tank, the interior of the valve being divided into pockets or compartments by means of the partitions 72. The walls of chute 66 guide the flowing materials into the compartments of the valve 67.

It has been said that the valve 67 is rotatably mounted with shaft 68. In order to effect rotation of the valve, a wheel 70 (Fig. 5) is provided with a notched periphery, indicated at 73, forming a ratchet, the teeth of which are engaged by a pawl 74 pivotally mounted as indicated at 75 on an arm 76 of a bell crank lever 77, which is turnably mounted on shaft 68. The other arm 78 of the lever 77 is connected by a rod 79 to a crank 80 (Fig. 1) eccentrically mounted with respect to shaft 38.

It will be seen that rotation of the crank 80 alternately pulls down upon and lifts the rod 79, causing corresponding actuation of the lever 77. As the rod 79 is pulled downwardly and the arms 76 and 78 are pulled downwardly, the pawl 74 being interlocked with the teeth 73 during the downward movement of the lever 77, turns the shaft 68 and advances the valve 67 correspondingly. As the rod 79 is lifted, the pawl 74 slides backwardly relatively to the teeth 73 of the ratchet so that the ratchet remains stationary during the upward movement of the rod 79. Thus the valve is turned only during the downward movement of rod 79.

The rate of discharge from the valve 67 is controlled by a shield plate 82 which is adjustable in its position relative to the pawl 74 by mechanism which comprises a rod 83 connected to sector 84 which is bolted as shown at 94 and 95 to the plate 82, as shown in Fig. 5. The connection between the rod 83 and the sector plate 84 includes a bracket 85 secured to the shield plate 82. The upper end of the rod 83 is adjustably connected at 86 to a lever 87 fixed to a transverse shaft 88 which is supported in a bearing on the bracket 91a. The rod 83 may be adjusted in length by means of the turn buckle member 83a.

Secured to the shaft 88 to move therewith is a lever 90 one arm of which is provided with an adjustable weight 90'. The other arm of the lever 90 is pivoted at 90a to the upper end of the vertical float 91. The bracket 91a is secured by means of bolts 91c to the angle iron cross piece 91ᵇ secured at its opposite ends to opposite walls of the tank.

Pivoted to the lower end of the bracket 91ᵃ is a link 87ᵃ the other end of which is pivoted to the float 91 at a point in vertical alinement with the pivot 90ᵃ. The link 87ᵃ is always parallel to the lever 90. Parallel motion mechanism is therefore provided to maintain the float 91 in vertical position irrespective of the extent to which it is immersed in the body of liquid E and in the bed of material on the screen F, as shown in Fig. 9. It should be understood that the buoyancy of the float 91 is regulated by adjusting the counterbalancing weight 90' along the lever 90. Inasmuch as the shaft 88 is rigidly connected to the lever 87 and also to the lever 90 any change in elevation of the float 91 will effect movement of the rod 83 and the parts connected to the lower end thereof as shown in Fig. 1.

The position of the float 91 is determined by the thickness of the bed of material of high specific gravity on the screen F. As the bed of material of high specific gravity increases in depth, this float 91 rises, and as the bed of high specific gravity material drops, the float 91 also drops. The float 91 thus automatically controls, through the elements 87, rod 83, and shield 82, the number of ratchet teeth engaged by the pawl 74 on each revolution of the crank 80, since engagement of the shield or plate 82 with the pawl 74 lifts the latter in accordance with the position of the float; thus the float, according to its position, will cause the pawl 74 to engage a variable number of teeth in accordance with the amount of materials of heavy specific gravity accumulating on the screen F, so that the higher the float 91 is lifted, the more teeth 73 will be engaged by the pawl 74 and the more rapid will be the discharge of materials from the bed. A gauge 88ᵃ is provided to indicate the depth of the bed. Obviously as the diaphragms move upwardly, the bed of materials on each screen F or F' will be loosened by the liquid pulsations conveyed thereto by the movement of the diaphragms, the materials being thereby agitated, the particles of highest specific gravity settling next to the screen and on the bottom of the bed, while the materials of lower specific gravity are maintained in a state of flow so that they are enabled to pass from one compartment into the next succeeding compartment, and so on until discharged from the jig. The sector 84 is of thin metal, being stiffened by the ribs 92, 93, which extend radially from auxiliary hubs 96 mounted on a main hub 127 on shaft 68, and turnable relatively to the hub, the ribs 92 and 93 being integral with the auxiliary hubs 96 of the sector plates 84.

It will be seen from Fig. 1 that as the shaft 38 rotates in a counter-clockwise direction, the rod 79 is lifted and the pawl 74 is moved counter-clockwise through an arc, following which the pawl 74 is moved in a clockwise direction in response to the down-stroke of the rod 79; and it will be understood that there is a sufficient time interval at the end of the maximum upward impulse on the diaphragm 1 to let the float act according to the upward velocity of the bed and the specific gravity of the mixture to automatically locate the plate or pawl lifter 82. When the pawl 74 is moved clockwise, the length of stroke will be in accordance with the amount of material to be moved from the lowermost layer of the bed.

Figure 3:
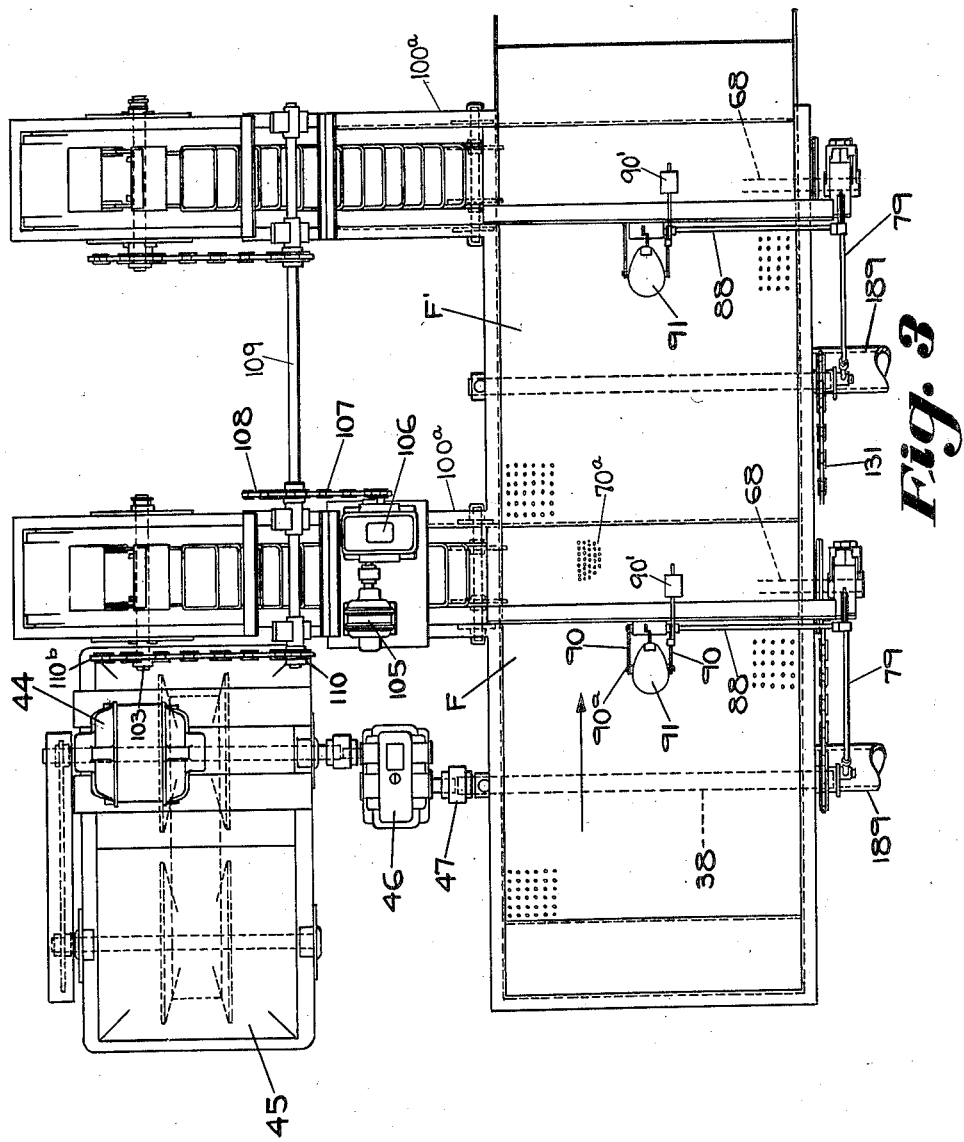
Fig. 3 is a plan view of the apparatus shown in Figs. 1 and 2.

The action of the mechanism just described will operate the valve 67 so that the pockets of the valve 67 are brought into registry with the discharge chute 66 and filled, being dumped as the valve is rotated with shaft 68. When discharged from the valve the material falls on an inclined trough 97, Fig. 2, which terminates in an elevator boot 98, whence it is picked up by elevating mechanism 99. This elevating mechanism, as illustrated, comprises an endless bucket elevator 100, guided around upper and lower double sprockets 101 and 102, (Fig. 1) sprockets 101 rotating with a shaft 103 mounted in frame 104 above the apparatus. The sprockets 101 are driven from a motor 105 coupled with a standard type of speed reducer 106, which drives chain 107 of the sprocket 108. Sprocket 108 is mounted on shaft 109, (Figs. 2 and 3) which carries sprocket 110, the sprocket 110 driving the sprocket 110ᵇ through sprocket chain 110ᵃ, sprocket 110ᵇ being secured to shaft 103 carrying sprockets 101. The buckets 111 of the elevator 100 are arranged to discharge into any suitable receptacle, such as discharge chute 126, for disposal of the separated materials. Each of the elevators operates in a lateral branch 100ᵃ of the tank, (Figs. 2 and 3) the lower portion of the elevators 100 being immersed in the water in the tank.

The heaviest gravity components being continuously separated in this manner from the remainder of the materials, the latter are guided by gravity down the perforated incline 70ᵃ onto a second screen F', where stratification is continued in a manner analogous to that previously described.

In order to prevent possible rotation of the discharge valve 67, under weight of materials in the pockets thereof, the valve is provided with brake mechanism comprising floating brake shoes 112 and 113 (Fig. 7) pivotally mounted at 114a and 115a respectively, on levers 112a and 113a, which, in turn, are pivotally mounted on a bracket 116 secured by bolts 125 to a side wall of the compartment. The brake shoes 112 and 113 bear against the sides of the ratchet wheel 70, engaging the ratchet wheel frictionally under pressure of a spring 117 mounted on a bolt 118, the bolt being threaded as indicated at 119, and pivotally mounted on the lever 113a, as indicated at 120. A nut 121 is positioned on the threads 119 of the bolt 118, and the spring 117 inserted over the bolt, the other end of the bolt being then inserted through a suitable aperture provided in the lever 112a. The force with which the brake shoes engage the ratchet wheel 70 is determined by the position of the nut 121 relative to the bolt 118, manipulation of the nut 121 to compress the spring 117 increasing the pressure exerted on the brake shoes 112 and 113 through levers 112a and 113a.

For lubrication, the shaft 68 is provided with an internal passage 122 having branches 123 and 124 leading to the auxiliary hubs 96 and the hubs of the bell cranks 77. The grease cup 128 is connected with the passage 122, lubricating grease being placed within the cup, additional lubricant being supplied as required by manipulation of the cap 129 of the grease cup which will force more lubricant through the passages 122, 123 and 124.

When the remaining materials, after separation of the highest specific gravity components, reach the screen F', they are stratified and the next highest gravity materials are separated, this operation being repeated as many times as may be necessary to give a final clean coal.

The mechanism for pulsating the bed of materials on the screen F'', the discharge mechanism, and the various controlling means therefor, are similar in construction to the mechanism previously described, and therefore the detailed description thereof need not be repeated. The parts of the apparatus corresponding to the parts already described are given the same reference numerals as above. In the apparatus illustrated in the drawings, the clean coal is discharged from the screen F'' over the right-hand overflow lip 70b and into the discharge chute 130 at the right-hand end of the apparatus as viewed in Fig. 1.

In Fig 1, it will be observed that the sprockets 81 are interconnected by a sprocket chain 131, so that the shaft 38a may be driven from the other shaft 38 and sprocket 81. Therefore, only one driving motor and set of connections is required for operating both sets of mechanism employed for pulsating and discharging the materials on the respective beds. Shaft 38a is mounted similarly to shaft 38 and also carries a cam 39, as before described.

It will also be seen that the two elevators 99 are driven from the single motor 105, the shaft 109 being extended, for this purpose, so as to be common to the two elevating conveyors 99, which are equipped with corresponding driving sprockets interconnected by sprocket chains as will be apparent from an inspection of Fig. 1.

Figure 10:
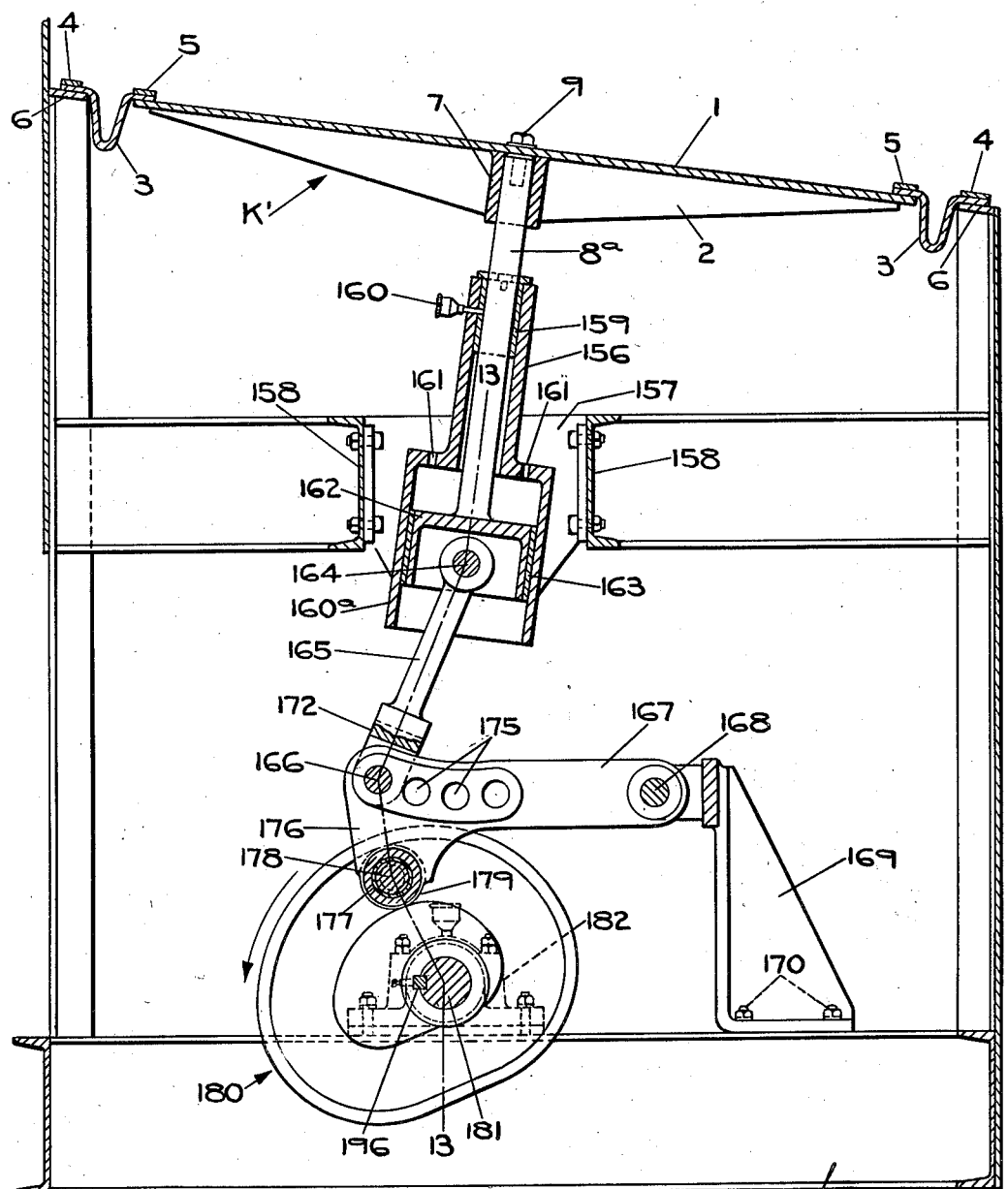
Fig. 10 is a sectional elevation showing details of construction of a somewhat different form of pulsation mechanism for the liquid and material, from that illustrated in Figs. 1 and 4.

Referring now to Fig. 10, it will be seen that there is illustrated a somewhat modified form of apparatus in which, however, the actuating cam has the same peripheral configuration as that of the previously described form. In Fig. 10, the connecting rod 8a of the diaphragm K' operates in a sleeve 156 rigidly mounted on a bracket 157 which is bolted or otherwise secured to cross channels 158 of the apparatus frame. The sleeve 156 supports the diaphragm K' in spaced relation to its screen and in parallelism thereto. The sleeve 156 is fitted with a bushing 159 in which the rod 8a reciprocates, there being lubricant supply means 160 provided for supplying lubricant between the bushing 159 and the rod 8a. The sleeve 156 is enlarged at its lower end to form a cylinder 160a, provided with vent openings 161. To the lower end of the rod 8a is secured a piston 162 which may be provided with a wear covering 163 fitting in the cylinder 160a.

Pivotally connected to the piston 162 through pin 164 is a pitman 165, the lower end of which is adjustably connected by a pin 166 to a generally horizontally extending lever 167, pivotally mounted through pin 168 to an upstanding bracket 169, bolted at 170 to the base angle member 171 of the apparatus frame.

From Fig. 13 it will be seen that the pitman 165 terminates at its lower end in a yoke 172 in which yoke the lever 167 is received and held by the pin 166 which passes through the yoke 172. A cup 174 is adapted to supply lubricant between the pin and the lever 167. Lever 167 is provided with a plurality of holes 175 disposed in an arc, the pin 166 being removably insertable into each of these holes, there being afforded thereby means for adjusting the length of the stroke of the diaphragm K'.

The lever 167 is formed with a downwardly extending bearing portion 176 provided with an internal bushing 177 through which is passed a shaft 178, the ends of which have rollers 179 secured thereto, as by keys 179a, the whole being revolubly mounted in the bearing 176 of the lever.

For operating the aforesaid mechanism, there is provided a cam 180 mounted on a shaft 181, which shaft is supported in bearings 182 mounted on corresponding base members, one of which base members is shown at 171.

Cam 180 may be formed of two correspondingly shaped sections 192 and 193, having hub portions 194 and 195, respectively, which, when the cam is assembled, are brought together as shown in Fig. 13. The sections 192 and 193 of the cam are keyed to the shaft as indicated at 196. Cam 180 is provided with a peripheral opening 183 between the sections 192 and 193, in which opening the projecting portion 176 of lever 167 is received, the roller members 179 running in grooves 184 extending laterally from the opening 183, the rollers 179 bearing against flanges 185 or shoulders 186 of the cam 180, thereby forming a guide track in which the roller structure runs. Cam 180 acts, through the medium of the grooves 184, to reciprocate the diaphragm K' rectilinearly at right angles to its plane. The resulting motion imparted to the diaphragm K' for any given case, is approximately like that imparted by cam 39. However, unlike cam 39, cam 180 is not dependent upon the force of gravity, to cause the diaphragm to follow the configuration of the cam, since cam 180 is positive in its action both upwardly and downwardly.

The stratification of the bed is illustrated in Fig. 9, which view is self-explanatory. The materials, such as coal, are supplied from a suitable source into a supply hopper 188. Water is introduced into the apparatus through intakes 189, and is forced upwardly through screen F by the diaphragm K. Stratification of the materials takes place on screen F, the heaviest particles, which in the case of coal ar slate and shale, settling to the bottom and being discharged by valve 67, falling therefrom into elevator boot 98 where it is picked up by the buckets 190 of the left-hand elevator 100 as viewed in Figs. 1 and 9, the rate of discharge being governed by the position of the left-hand float 91, as previously explained. The materials of lower specific gravity flow over the left-hand baffle 191, Figs. 1 and 9, then pass down the inclined guide screen 70a onto the second screen F', where it is further stratified by action of the right-hand diaphragm mechanism. The height of baffle 191 on the left, may be made lower than that of the right-hand baffle 191, to allow the stratified material of low specific gravity to flow from the first compartment to the second compartment in a stratified condition. As in the first compartment, the materials of highest specific gravity such as slate and rock are stratified on screen F' and are discharged by way of the right-hand valve 67, as viewed in Fig. 9. In the case of coal, the next fraction to be removed is the "bone" or "boney coal", the right-hand float 91 controlling the discharge of this fraction. The cleaned material, such as cleaned coal, may be discharged through the discharge 130, together with effluent water. The water, of course, is maintained continuously circulating through the apparatus and over the screens. It will be understood that the number of the screens and the mechanism associated therewith may be multiplied as many times as required to clean the material, or the material coming from the discharge 130 may be repassed through the apparatus for re-treatment, should such be required by the nature of the materials being acted upon.

It will be noted that, in order to facilitate the guiding of the material discharged from the respective valves 67 into each boot 98, there is provided a baffle plate 197 sloping downwardly and inwardly towards the trough 97 of the boot 98, a certain amount of the material falling from the valves hitting the plate 197 and being deflected therefrom into the boot 98 where they are picked up by the elevator buckets.

Plates 198, 198' extend across the upper portions of the compartments L, to prevent the surging of water in these compartments, which surging would tend to interfere with the elevating of the materials picked up by the elevator buckets. Each of the plates 198, 198' is mounted on an angle support 199, extending across the tank and welded to the front and rear walls of the tank.

It will be noted by referring to Figs. 2 and 9 that the bottom of the compartment containing the body of liquid B is distributed over a wide area and that almost the entire area of the bottom is reciprocable upwardly and downwardly. This is particularly desirable for the purpose of obtaining a quick upward impulse of the entire body of liquid B so as to uniformly distribute the upward flow of liquid through the screen F to uniformly open up the bed or to place in suspension the constituents of the bed in the liquid. After the receding movement of the liquid begins, the particles of light and intermediate specific gravities will arrange themselves in the upper portions of the bed as shown in Fig. 9 to form a mixture which determines the buoyancy of the float 91 and the position taken by the float regulates the rate of operation of the valve 67 by means of the mechanism shown in Fig. 1. It will thus be seen that the operation is automatic to regulate the speed of operation of the valve 67 in accordance with the amount of heavy gravity constituents such as slate and stones or grit, to be removed from the bed as shown at the upper lift-hand portion of Fig. 9. In the same manner the float 91 at the upper right-hand portion of Fig. 9 controls the automatic mechanism shown in Fig. 1 to operate the valve 67 at the right-hand end of Fig. 9 to remove the intermediate gravity constituents such as "bone coal", in accordance with the quantity thereof, the clean coal being finally delivered to the chute 130.

The time-velocity curve of fluid movement shown in Fig. 14 may follow any cycle which may be selected. In actual practice it may be desirable to follow different curves depending upon several different factors, such as the size range of coal to be treated, the constituency of the raw coal, or the particular kind of refuse encountered. A plurality of cams of different configuration to produce different curves will therefore be kept available. These cams may, of course, be interchangeably mounted, as desired. In addition, a different curve may be desired for each of the two or more different compartments. That is, the treatment on screen F may preferably be different from the treatment on screen F'. Therefore cams of different configuration may be employed on shafts 38 and 38a.

Figure 12:
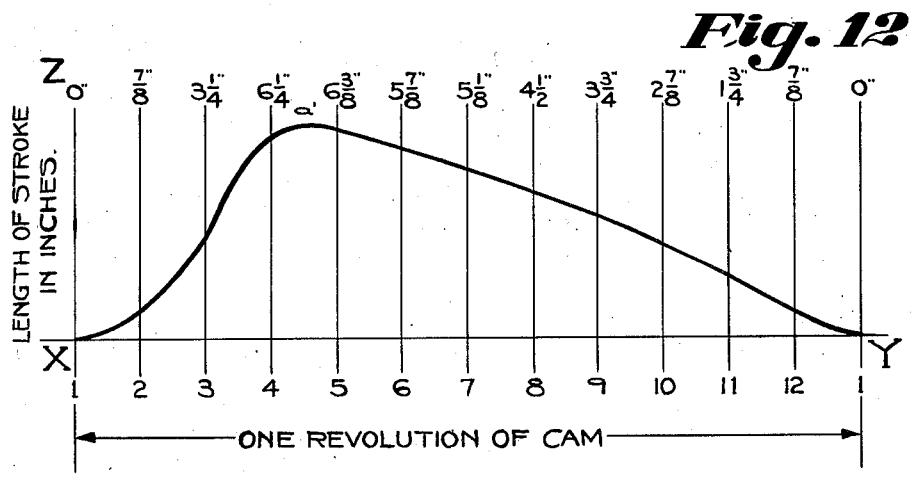
Fig. 12 is a curve showing the successive heights of the liquid wave in inches during one full revolution of the cam. The abscissae $x$—$y$ representing one revolution of the cam and the ordinates $x$—$z$ the level of the wave at the corresponding successive positions of the cam.
Figure 11:
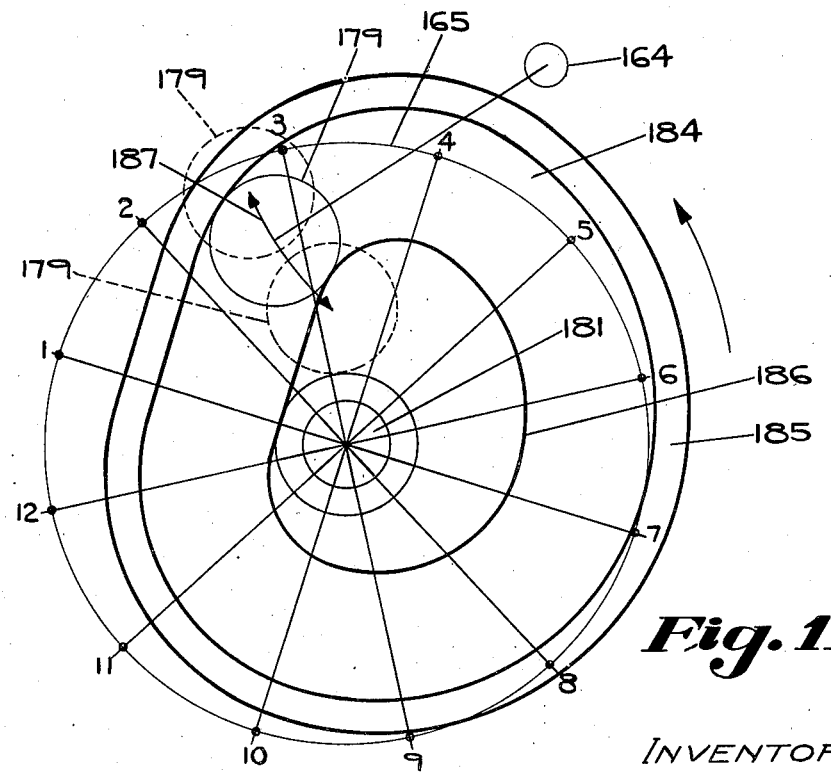
Fig. 11 is a detail diagrammatic showing of the cam employed as the agitating means.

It may be stated that when any desired time-velocity curve, as the curve of Fig. 14 is desired, a wave curve or developed cam curve is obtained by integrating said time-velocity curve. That is, the curve of Fig. 12 results from the integration of the curve of Fig. 14, assuming said curve of Fig. 12 is the developed cam curve to give the time-velocity curve of Fig. 14. The curve of Fig. 12 is then divided into any number of equal parts, as 12. To design the cam a circle is divided into the same number of equal angular parts, 12. Concentric with said circle is inscribed a circle representing the cam hub or minimum cam radius. This circle is representative of the base of the curve of Fig. 12 and at each interval the distance of the curve along the ordinate, as measured on curve 12, is plotted along the corresponding radial line of the circle and measured from the base circle. As seen in Fig. 11, the inner cam surface touches the minimum or base circle on the radial line numbered 1. Each point at which the cam surface crosses the subsequent radial lines is a distance from the base circle equal to the corresponding distance of the curve from base $x$—$y$ of Fig. 12.

As illustrated in the drawings the screens F and F' are rigidly attached to the tanks B. However, this is by no means necessary and in certain cases it has been found desirable to carry said screens on a frame, as of angle members as illustrated, but with the frames and screens pivotally mounted at their discharge side and carried on adjustable brackets at their forward end adjacent the side walls of the tanks B. This adjustment is particularly desirable to provide an adjustable rate of travel of the bed of material across the screens F and F'.

The apparatus herein disclosed, is particularly well adapted to carry out the method of jigging disclosed in the application of Byron M. Bird for an improved Method of jigging Serial No. 736,443 filed July 23, 1934, particularly in that the cam surface 39 may be of such a configuration to produce any one of the time-velocity fluid curves there illustrated. However, it is to be understood that said apparatus is capable of general application and may be employed to produce any desired cycle of jigging operation.

Obviously those skilled in the art may make various changes in the details and arrangement of parts without departing from the spirit and scope of the invention as defined by the claims hereto appended, and we therefore wish not to be restricted to the precise construction herein disclosed.

Having thus described and shown an embodiment of our invention, what we desire to secure by Letters Patent of the United States is:

1. A material treating apparatus adapted to classify a bed of materials, which comprises the combination with a tank adapted to contain a body of fluid, of a supporting screen for the bed, a diaphragm beneath the screen in fluid-tight relation with the tank, a cam for producing a pulsation of the bed, and mechanism connecting the said cam and diaphragm for transmitting motion from the cam to the diaphragm to move said diaphragm in parallelism, the said mechanism including cooperating pivoted levers forming a parallel motion mechanism, a roller adapted to engage the cam for riding on the surface of the cam, and means on the levers for varying the length of stroke of the diaphragm, said parallel motion mechanism insuring a parallel movement of said diaphragm relative to said screen.

2. In a jig, the combination with a frame supporting a tank adapted to contain a body of fluid, of a screen carried by said tank and sloping longitudinally thereof, an imperforate diaphragm positioned below the screen and forming the bottom of said tank, said diaphragm having a flat surface approximately equal in area to and parallel with said screen, flexible means connecting said diaphragm to the tank to permit oscillation of said diaphragm thereby to force liquid upwardly through said screen, means for supporting said diaphragm, said means comprising a parallel motion mechanism comprising parallel links pivoted to said frame and to a shaft supporting said diaphragm, said links being so constructed and arranged as to remain parallel at all times for guiding said diaphragm to insure the maintenance of the parallel relation between said diaphragm and screen, means associated with said parallel motion mechanism for counterbalancing the static load on said diaphragm, and means including said parallel motion mechanism for oscillating said diaphragm.

3. In a jig, the combination with a tank adapted to contain a body of fluid, of a screen carried by said tank, an imperforate diaphragm positioned below the screen and forming the bottom of said tank, said diaphragm having a flat surface approximately equal in area to and parallel with said screen, flexible means connecting said diaphragm to the tank to permit oscillation of said diaphragm thereby to force liquid upwardly through said screen, means for supporting said diaphragm, said means comprising mechanism to insure the maintenance of the parallel relation between said diaphragm and screen, means associated with said mechanism for counterbalancing the static load on said diaphragm, and means including said mechanism for oscillating said diaphragm.

4. In a jig, the combination with a frame supporting a tank adapted to contain a body of fluid, of a screen carried by said tank and sloping longitudinally thereof, an imperforate diaphragm positioned below the screen and forming the bottom of said tank, said diaphragm having a flat surface approximately equal in area to and parallel with said screen, flexible means connecting said diaphragm to the tank to permit oscillation of said diaphragm thereby to force liquid upwardly through said screen, means for supporting said diaphragm, said means comprising a parallel motion mechanism comprising parallel links pivoted to said frame and to a shaft supporting said diaphragm, said links being so constructed and arranged as to remain parallel at all times for guiding said diaphragm to insure the maintenance of the parallel relation between said diaphragm and screen, and means including said parallel motion mechanism for oscillating said diaphragm.

5. In a jig, the combination with a tank adapted to contain a body of fluid, of a screen carried by said tank, an imperforate diaphragm positioned below the screen and forming the bottom of said tank, said diaphragm having a flat surface approximately equal in area to and parallel with said screen, flexible means connecting said diaphragm to the tank to permit oscillation of said diaphragm thereby to force liquid upwardly through said screen, means for supporting said diaphragm, said means comprising a parallel motion mechanism comprising parallel pivoted links for guiding said diaphragm to insure the maintenance of the parallel relation between said diaphragm and screen, and means including said parallel motion mechanism for oscillating said diaphragm.

6. In a jig, the combination with a tank adapted to contain a body of fluid, of a screen carried by said tank and sloping longitudinally thereof, an imperforate diaphragm positioned below the screen and forming the bottom of said tank, said diaphragm having a flat surface approximately equal in area to and parallel with said screen, flexible means connecting said diaphragm to the tank to permit oscillation of said diaphragm thereby to force liquid upwardly through said screen, means for supporting said diaphragm, said means comprising a parallel motion mechanism for guiding said diaphragm to insure the maintenance of the parallel relation between said diaphragm and screen, means associated with said parallel motion mechanism for counterbalancing the static load on said diaphragm, and means including said parallel motion mechanism for oscillating said diaphragm.

7. In a jig, the combination with a tank, of partition means dividing said tank into a plurality of compartments, material supporting screens, one in each compartment, a weir followed by a chute over which material passes from one compartment to the next, said chute comprising a sloping perforate screen, and means constructed and arranged to cause the jigging liquid to move through said screens to stratify material thereon and to move through said sloping perforate screen to continue the stratification as the material being treated moves from one compartment to the next.

8. In a jig, the combination with a frame, of a tank carried thereby, a reciprocable member in said tank, a shaft rigidly attached to said member, a piston on said shaft, a guide for said shaft constructed and arranged to restrict its movement to movement along its own axis comprising a cylinder within which said piston reciprocates, said cylinder having an extended neck carrying a bushing having sliding contact with said shaft, said cylinder being vented to atmosphere to permit free movement of said piston therein in at least one direction of movement, and means for reciprocating said shaft.

9. In a jig, the combination with a frame, of a tank having a flexible bottom including a reciprocable diaphragm, a cam carried by said frame having both upper and lower cam surfaces between which a roller rides which roller is carried on a pivoted arm, means for rotating said cam to swing said pivoted arm, means constructed and arranged to translate the swinging movement of said arm into reciprocatory movement of said diaphragm comprising a shaft rigidly attached to said diaphragm, and means restricting movement of said shaft to reciprocatory movement along its own axis.

10. In a jig, the combination with a frame, of a tank carried by said frame, a screen in said tank, a reciprocable element for moving fluid through said screen in cyclic operation; and means for reciprocating said element comprising a cam mounted for rotation on said frame and having spaced apart parallel upper and lower cam surfaces, an arm pivoted to said frame, a roller on said arm riding between said cam surfaces, the arm swinging in a manner determined by the shape of said cams, means for translating the swinging motion of said arm to said reciprocable element and maintaining the motion of said element along a fixed axis, comprising a shaft rigidly attached to said reciprocable element and having a piston attached thereto, guide means restricting motion of said shaft to reciprocatory motion along its axis comprising a cylinder carried by said frame, within which cylinder said piston moves, and a neck on said cylinder having a bearing in sliding contact with said shaft.

11. In a jig, the combination with a frame, of a tank mounted on said frame and having a flexible bottom formed by a movable diaphragm, means constructed and arranged to guide said diaphragm to reciprocate along a single axis, means for reciprocating said diaphragm as aforesaid through variable strokes comprising a cam positioned directly below said flexible bottom and mounted for rotation on said frame, a lever pivoted to said frame and having means riding on said cam whereby said lever will swing upon rotation of said cam, and means constructed and arranged to impart the swinging motion of said lever into reciprocable motion of said diaphragm and with a stroke of the latter which may be variably determined.

12. In a jig, the combination with a tank having a flexible bottom, of means for reciprocating said bottom comprising a cam having coaxial spaced apart upper and lower cam surfaces, a pivoted lever having a roller rolling between said cam surfaces, the lever swinging in a manner determined by the shape of said cam surfaces, and means constructed and arranged to translate the swinging movement of said lever into reciprocable motion of said flexible bottom.

13. In a jig, the combination with a frame, of a reciprocable element, means for reciprocating said element, means for guiding the movement of said reciprocable element comprising a frame member formed of spaced channel members, a shaft rigidly attached to said reciprocable element and having a piston thereon, and a guide for said shaft comprising a cylinder rigidly mounted between said spaced channels within which cylinder said piston reciprocates.

14. In a gravity separator, the combination with a frame, of a tank having a flexible bottom formed by a diaphragm, means for reciprocating said diaphragm, guide means for said diaphragm comprising a frame member formed by spaced channels, a shaft having a piston rigidly attached to one end and rigidly attached to said diaphragm at the other end, a guide for said shaft comprising a cylinder carried between said channels and receiving said piston, said cylinder having a neck provided with a bearing through which said shaft reciprocates.

BYRON M. BIRD.
ERNST F. MULLER.